(12) United States Patent
Emerick et al.

(10) Patent No.: US 9,347,402 B2
(45) Date of Patent: May 24, 2016

(54) SYSTEM FOR MEASURING EGR FLOW AND METHOD FOR REDUCING ACOUSTIC RESONANCE IN EGR SYSTEM

(71) Applicant: Cummins Intellectual Properties, Inc., Minneapolis, MN (US)

(72) Inventors: Gregory L. Emerick, Columbus, IN (US); David J. Moenssen, Columbus, IN (US); Brian R. Alderfer, Columbus, IN (US); Joshua R. Miller, Bloomington, IN (US); Gregory H. Henderson, Columbus, IN (US); Lisa A. Orth-Farrell, Columbus, IN (US); Robert E. Dehner, Columbus, IN (US)

(73) Assignee: CUMMINS INTELLECTUAL PROPERTIES, INC., Minneapolis, MN (US)

( * ) Notice: Subject to any disclaimer, the term of this patent is extended or adjusted under 35 U.S.C. 154(b) by 274 days.

(21) Appl. No.: 14/165,170

(22) Filed: Jan. 27, 2014

(65) Prior Publication Data

US 2014/0290633 A1    Oct. 2, 2014

Related U.S. Application Data

(63) Continuation of application No. 12/891,495, filed on Sep. 27, 2010, now abandoned.

(60) Provisional application No. 61/245,926, filed on Sep. 25, 2009.

(51) Int. Cl.
*F02M 25/00* (2006.01)
*F02M 25/07* (2006.01)
*F02D 41/00* (2006.01)

(52) U.S. Cl.
CPC ....... *F02M 25/0715* (2013.01); *F02M 25/0754* (2013.01); *F02D 41/0072* (2013.01); *F02D 2200/0406* (2013.01); *Y02T 10/121* (2013.01); *Y10T 29/49231* (2015.01)

(58) Field of Classification Search
CPC ............... F02D 2200/0406; F02D 2200/0408; F02D 41/0072; F02M 25/0715; F02M 25/0754; Y02T 10/121; Y02T 29/49231
USPC ........... 123/568.16, 568.17, 568.21; 701/108; 73/114.33, 114.74, 114.32; 702/47, 702/182, 183
See application file for complete search history.

(56) References Cited

U.S. PATENT DOCUMENTS

| | | | |
|---|---|---|---|
| 2,119,166 A | | 5/1938 | Kadenacy |
| 3,331,248 A | * | 7/1967 | Barker .................... G01F 1/383 73/713 |
| 3,477,665 A | | 11/1969 | Legrand |
| 3,555,504 A | * | 1/1971 | Fields .................... E21B 47/18 137/557 |
| 4,098,133 A | | 7/1978 | Frische et al. |

(Continued)

*Primary Examiner* — Erick Solis
*Assistant Examiner* — Carl Staubach
(74) *Attorney, Agent, or Firm* — Foley & Lardner LLP (57) ABSTRACT

An intake body, systems, and method for reducing acoustic resonance in pressure tap passages include determining and/or setting the length of the drilling tap passages to a value such that the natural frequency of each pressure tap passage is outside of or does not substantially overlap with operational frequency content of an air stream in the intake body. The intake body, systems and method reduce the possibility of exciting the natural acoustic frequencies of the pressure tap passages, and can lead to improved signal-to-noise ratio when detecting EGR flow using a delta-P measurement system.

12 Claims, 4 Drawing Sheets

(56) References Cited

U.S. PATENT DOCUMENTS

| | | | |
|---|---|---|---|
| 4,144,768 | A | 3/1979 | Andersson et al. |
| 4,406,161 | A | 9/1983 | Locke et al. |
| 4,555,952 | A * | 12/1985 | Jenkins .................. G01F 1/383 |
| | | | 73/718 |
| 4,562,744 | A | 1/1986 | Hall et al. |
| 5,086,655 | A | 2/1992 | Fredericks et al. |
| 5,220,535 | A | 6/1993 | Brigham et al. |
| 5,613,479 | A | 3/1997 | Gates et al. |
| 6,601,387 | B2 | 8/2003 | Zurawski et al. |
| 6,609,058 | B1 | 8/2003 | Russell et al. |
| 6,687,600 | B2 | 2/2004 | Russell et al. |
| 6,820,600 | B1 | 11/2004 | Sisken et al. |
| 6,850,833 | B1 * | 2/2005 | Wang .................. F02D 41/0055 |
| | | | 123/568.12 |
| 6,944,530 | B2 | 9/2005 | Russell et al. |
| 7,089,106 | B2 * | 8/2006 | Kaga .................. F02D 41/0002 |
| | | | 701/103 |
| 7,110,878 | B2 | 9/2006 | Nakamura et al. |
| 7,290,528 | B2 | 11/2007 | Minegishi et al. |
| 2002/0196153 | A1 * | 12/2002 | Kinugawa ............... F01N 9/002 |
| | | | 340/606 |
| 2004/0065303 | A1 | 4/2004 | Russell et al. |
| 2006/0173607 | A1 * | 8/2006 | Matsuo .................. G01F 1/34 |
| | | | 701/114 |
| 2009/0084193 | A1 * | 4/2009 | Cerabone ........... F02M 25/0754 |
| | | | 73/861.64 |
| 2012/0167665 | A1 * | 7/2012 | Garimella ........... F02D 41/0072 |
| | | | 73/23.31 |

* cited by examiner

SYSTEM FOR MEASURING EGR FLOW AND METHOD FOR REDUCING ACOUSTIC RESONANCE IN EGR SYSTEM

CROSS-REFERENCE TO RELATED APPLICATIONS

The present application is a continuation of U.S. patent application Ser. No. 12/891,495, filed Sep. 27, 2010 which claims priority to U.S. Provisional Application No. 61/245,926, filed Sep. 25, 2009. The entire contents of both applications are incorporated herein by reference in their entirety.

FIELD OF THE INVENTION

The inventions generally relate to an apparatus, systems, and method for measuring recirculated exhaust gas (EGR), and more particularly to systems, an apparatus and method for determining pressure difference measurements across an EGR metering orifice at an intake body of an internal combustion engine.

DETAILED DESCRIPTION

Since the 1970's, government legislation has required increasing reductions of NOx in exhaust gas emissions. To comply with increasingly stringent government mandates, industry has developed several EGR (Exhaust Gas Recirculation) systems to control NOx emissions. Emissions targets for 2010 and beyond require use of extreme high fidelity EGR flow measurement to control NOx during engine transients, as well as to provide precise measurement of EGR flow resulting from exhaust manifold pulsations.

EGR flow is often measured using a delta-p (differential pressure) sensor which utilizes pressure measurement devices on both sides of a flow restriction mechanism, such as a metering orifice. The delta-P sensor provides a delta pressure signal indicative of a pressure differential across the flow restriction mechanism. From the delta pressure signal, the on-board computer can determine the rate of EGR flow.

SUMMARY

The present inventions provide an apparatus, systems and method for reducing acoustic resonance in pressure tap passages in an intake body and include designing and/or setting the length of the drilling tap passages to a value such that the natural frequency of each pressure tap passage does not substantially overlap with operational frequency content of an air stream in the intake body. The intake body, systems and method can reduce the possibility of exciting the natural acoustic frequencies of the pressure tap passages, and can lead to improved signal-to-noise ratio when detecting EGR flow using a delta-P measurement system.

In an embodiment consistent with the claimed invention, a system for measuring an exhaust gas flow provided to an intake system of an internal combustion engine includes an intake body including a main chamber, an air inlet port to supply a stream of intake air to said main chamber, and an exhaust inlet port including a metering orifice to deliver an exhaust gas stream to the main chamber. A first pressure tap passage is provided upstream of the metering orifice and has a first length between first and second distal ends thereof. A second pressure tap passage is provided downstream of the metering orifice and has a second length between third and fourth distal ends thereof. A delta pressure sensor communicates with the first pressure tap passage to measure pressure upstream of the metering orifice, and communicates with the second pressure tap passage to measure pressure downstream of the metering orifice, the differential pressure sensor producing a signal based on a difference in the measured pressure. The values of the first and second lengths of the pressure tap passages prevent excitation of the natural acoustic frequencies of the respective first and second pressure tap passages by air stream frequency content during operation of the intake body.

An internal combustion engine system in accordance with an exemplary embodiment consistent with the claimed invention includes an engine, an intake manifold connected to the engine, an intake body fluidly connected to the intake manifold. The intake body includes a main chamber through which intake charge flows, an exhaust manifold and main exhaust passage connected to the engine, an exhaust gas recirculation (EGR) passage fluidly connected at one end thereof to the main exhaust passage and at another end thereof to the main chamber of the intake body, and a metering orifice positioned between the main chamber of the intake body and the EGR passage. The metering orifice causes EGR gas flow in the EGR passage to have a pressure as measured at a first side of the orifice different from a pressure in the main chamber of the intake body as measured at a second side of the orifice. The system includes a first pressure tap passage fluidly connected to the EGR passage upstream of the first side of the orifice. a second pressure tap passage fluidly connected to said main chamber of said intake body, and a delta pressure sensor communicating with said first pressure tap passage to measure pressure upstream of the metering orifice and communicating with said second pressure tap passage to measure pressure downstream of the metering orifice. The lengths of each of the first and second pressure tap passages are set to substantially prevent excitation of acoustic resonance of the first and second pressure tap passages by operational frequencies of the air stream in the intake body.

Another aspect consistent with the claimed invention includes a method of reducing acoustic resonance in an exhaust gas recirculation (EGR) system including an intake body having a main chamber, an air inlet port to supply a stream of intake air to said chamber, an exhaust inlet port including a metering orifice to deliver an exhaust gas stream to the chamber, and a differential pressure sensor. The method includes determining air stream frequency content present in the intake body during operation of the intake body. Using the determined frequency content, a maximum length is determined for a first pressure tap passage in the air intake body for measuring pressure upstream of the metering orifice and for a second pressure tap passage for measuring pressure downstream of the orifice such that natural acoustic resonance of each of the first and second pressure tap passages is substantially outside the operating air stream frequency content of the intake body. The method includes forming first and second pressure tap passages having lengths less than or equal to the determined maximum length values.

According to another aspect, an embodiment consistent with the claimed invention is an intake body for an internal combustion engine. The intake body includes a main chamber, an air inlet port to supply a stream of intake air to the main chamber, and an exhaust inlet port including a metering orifice having an obstruction to cause a pressure differential on either side thereof. The exhaust inlet port is positioned on a side of the intake body to deliver an exhaust gas stream at a first pressure to the main chamber. A first pressure tap passage has a first distal end open to the exhaust inlet port metering orifice and a second distal end configured to receive a pressure sensor device. A second pressure tap passage has a third distal end open to the main chamber provided downstream of the metering orifice and a fourth distal end configured to receive a pressure sensor device. The second pressure tap passage has a second length between third and fourth distal ends thereof. The natural acoustic frequencies of the first and second pressure tap passages are outside an operational air stream frequency bandwidth of the intake body.

The various aspects are described hereafter in greater detail in connection with a number of exemplary embodiments to facilitate an understanding of the invention. However, the invention should not be construed as being limited to these embodiments. Rather, these embodiments are provided so that the disclosure will be thorough and complete, and will fully convey the scope of the invention to those skilled in the art.

DETAILED DESCRIPTION

Figure 1:
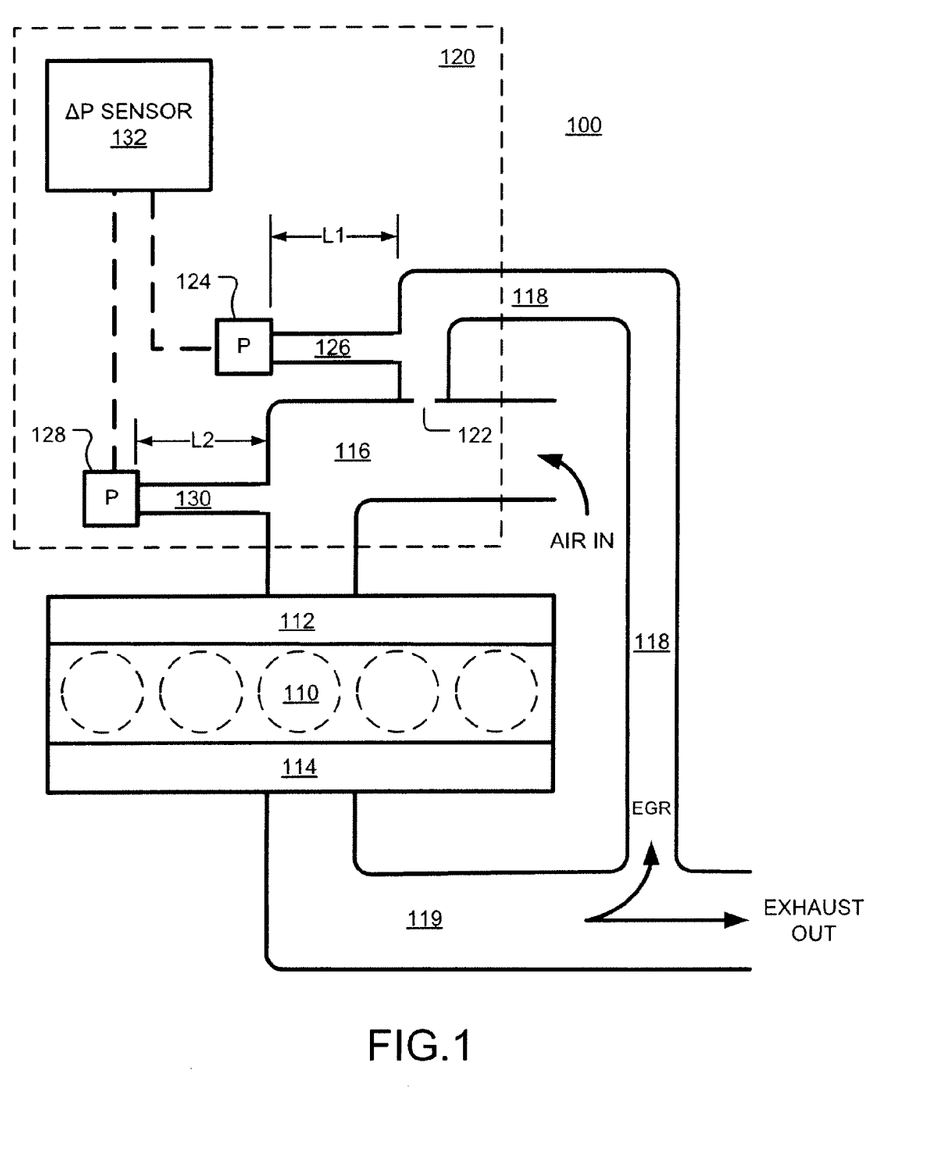
FIG. 1 is a diagram of an internal combustion engine system according to an exemplary embodiment.

FIG. 1 shows an exemplary embodiment of an internal combustion engine system 100 including an internal combustion engine 110 having an intake manifold 112 and exhaust manifold 114. The intake manifold 112 includes, or has attached thereto an intake body 116 in which air and EGR gas are mixed to provide intake charge air (and EGR) to the cylinders of the internal combustion engine 110. Although not shown, the internal combustion engine system 100 can include at least one turbocharger having a compressor mechanically coupled to a turbine to provide air at a pressure higher than ambient pressure to the intake manifold 112. The turbocharger compressor has an inlet for receiving ambient air and an outlet fluidly coupled to the intake body 116 for providing compressed air to the intake manifold 112. The turbocharger turbine includes an inlet fluidly coupled to the exhaust stream from the exhaust manifold 112 and an outlet for providing the exhaust gases to an exhaust aftertreatment system (not shown) downstream of the turbine. The EGR gas is provided to the intake body 116 along an EGR passage 118, which can be a tube, pipe and/or other conduit element fluidly connecting an outlet from a main exhaust passage 119 to the intake body 116. Although not shown, the EGR passage 118 can include other devices, such as an EGR valve to control an amount of EGR gas flow in the EGR passage 118 and a heat exchanger to cool the EGR gas flow.

For precise EGR flow measurements, EGR gases are metered using a high-rate EGR differential pressure (delta-P) measurement system 120. As shown in FIG. 1, the delta-P measurement system 120 includes a metering orifice 122 in the EGR exhaust stream between a main inside chamber of the intake body and the EGR passage 118, for example, positioned at or near the entrance to the main inner chamber of the intake body 116. The metering orifice 122 contains an obstruction, such as a fixed-geometry flow restriction device in the path of the exhaust stream for creating a pressure differential across the EGR passage 118 and the intake body 116. In operation, delta-P pressure tap passages are coupled to at least one transducer of the high rate delta-P measurement system 120, which communicate static pressure across a metering orifice. More specifically, the delta-P measurement system 120 includes a pressure sensor 124 fluidly connected to the EGR passage 118 via a delta-P pressure tap passage 126 of length L1 to measure a high pressure side of the metering orifice 122, and a pressure sensor 128 is fluidly connected to intake body 116 via a delta-P pressure tap passage 130 of length L2 to measure a low pressure side of the metering orifice 122. The delta-P pressure tap passages 126, 130 can be a tube, pipe, drilling, or other conduit to provide a passage fluidly connecting the pressure sensor with the EGR gas flow to be sensed. The pressure sensors 124, 128 are connected to a delta-P sensor 132 of known construction via respective signal paths shown in dashed lines in FIG. 1. The delta-P sensor 132 receives signals generated by the respective pressure sensors 124, 128 and generates a delta-P signal indicative of the pressure difference between the EGR passage 118 on one side of the metering orifice 122 and the intake body 116 on the other side of the metering orifice 122.

The delta-P sensor 132 can be provided separate from, or as a part of a control module (not shown), such as an engine control module (ECM) of known construction, that monitors the performance of the engine 110 and other elements of the internal combustion engine system 100. The control module can be a single unit or plural control units that collectively perform these monitoring and control functions. The control module utilizes sensors to determine whether elements of internal combustion engine system 100 are functioning properly. The control module generates control signals based on information provided by sensors described herein and perhaps other information, for example, stored in a database or memory integral to or separate from the control module. The control module can include a processor and modules in the form of software or routines that are stored on tangible computer readable media such as memory, which is executable by the processor of the control module. In alternative embodiments, the module of control module can include electronic circuits for performing some or all or part of the processing, including analog and/or digital circuitry. The modules can comprise a combination of software, electronic circuits and microprocessor based components. The control module can receive data indicative of engine performance and exhaust gas composition including, but not limited to engine position sensor data, speed sensor data, exhaust mass flow sensor data, fuel rate data, pressure sensor data, temperature sensor data from locations throughout the internal combustion engine system 100 and generate control signals and output these signals to control various components in the system 100.

The control module includes an EGR flow determining module (not shown). The delta-P signal generated by the delta-P sensor 132 is provided to the EGR flow determining module. In some embodiments, the EGR flow determining module is a virtual sensor that determines the EGR flow based on a correlation of the delta-P signal to a mass flow rate. For example, the EGR flow determining module can correlate a delta-P signal to a mass flow rate using an EGR flow virtual sensor using a look-up table stored in memory, or by using other means implemented in hardware such as an application specific integrated circuit (ASIC), and/or calculated from operating parameters and a predetermined relation.

The delta-P measurement system 120 samples the pressure on both sides of a metering orifice 122 using a fast sampling rate, or "high data-rate." However, the inventors have recognized that high data-rate delta-P measurement systems are vulnerable to acoustic resonance of EGR gas in metering structures of the air intake body and can result in a poor signal to noise (S/N) ratio. The inventors have recognized that poor S/N ratio can result from the amplitude of the acoustic resonance at high frequency being far larger than static delta-P being measured, and that this high frequency noise overwhelmed and/or distorted or "swamped out" the range of a delta-P sensor. making the EGR delta-P measurement systems imprecise and unreliable.

More specifically, it was found that as the sensitivity of the delta-P sensors increases, the frequency bandwidth associated with the sampling rate of the sensor increases and overlaps with frequencies of acoustic resonance caused by the natural frequency excitation of an air volume inside the EGR delta-P pressure tap passages 126, 130. For example, when using a differential pressure sensor of a particular operating frequency bandwidth, and the length L1 of delta-P pressure tap passage 126 and the length L2 of the pressure tap passage 130 were more than three inches, the natural frequency of the air volume they contained, which is a function of the length of the column of air, lines up with and distorts the frequency content of air stream pressure pulses coming out of the charge air cooler and/or fresh air stream inside the air handling system. Because of severe acoustic resonance inside these long delta-P pressure tap passages, precise EGR flow measurement was not possible in a high data rate system, such as those requiring high sampling rates of EGR flow measurements.

To make more accurate, precise and reliable exhaust gas recirculation flow measurements at the intake body of an internal combustion engine, embodiments consistent with the claimed invention to use short lengths for L1 and L2 of the delta-P pressure tap passages 126, 130, respectively, such that each of the delta-p pressure tap passage lengths L1, L2 is a value which prevents acoustic resonance of the pressure tap passage within the operable frequency bandwidth of the air stream in the intake body. Providing pressure tap passages of not more than about 3 inches can ensure that their natural acoustic frequencies do not overlap or substantially overlap with operational air stream frequencies in the intake body that can excite the natural acoustic frequencies. In a more preferable embodiment, the lengths L1 and L2 are not more than about 2 inches by limiting the delta-P pressure tap passages to particular predetermined lengths, the natural acoustic frequency is moved away from operating frequencies of an air stream in the air handling system, thus mitigating acoustic resonance in the pressure tap passages to improve the S/N ratio of the delta-P sensor system.

Figure 2A:
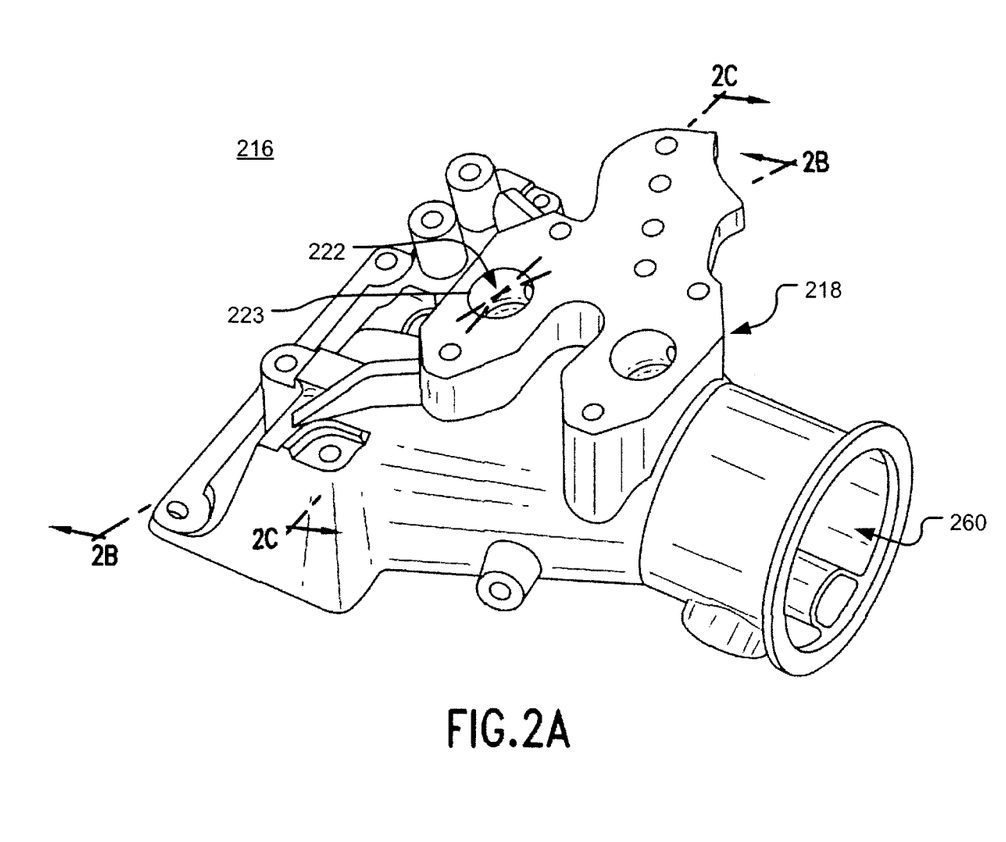
FIG. 2A is a perspective view diagram of an intake body in accordance with an exemplary embodiment.
Figure 2B:
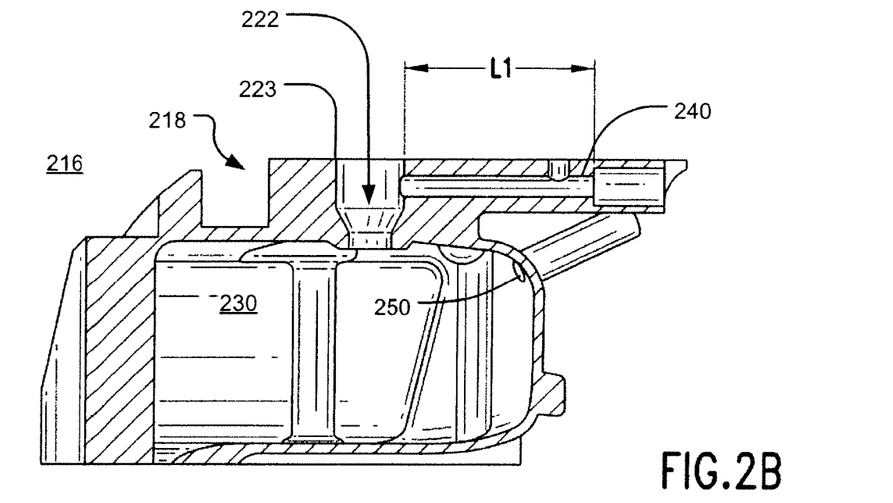
FIG. 2B is a cross-sectional diagram of the intake body shown in FIG. 1 taken along line B-B and as viewed in the direction downstream of the air stream.
Figure 2C:
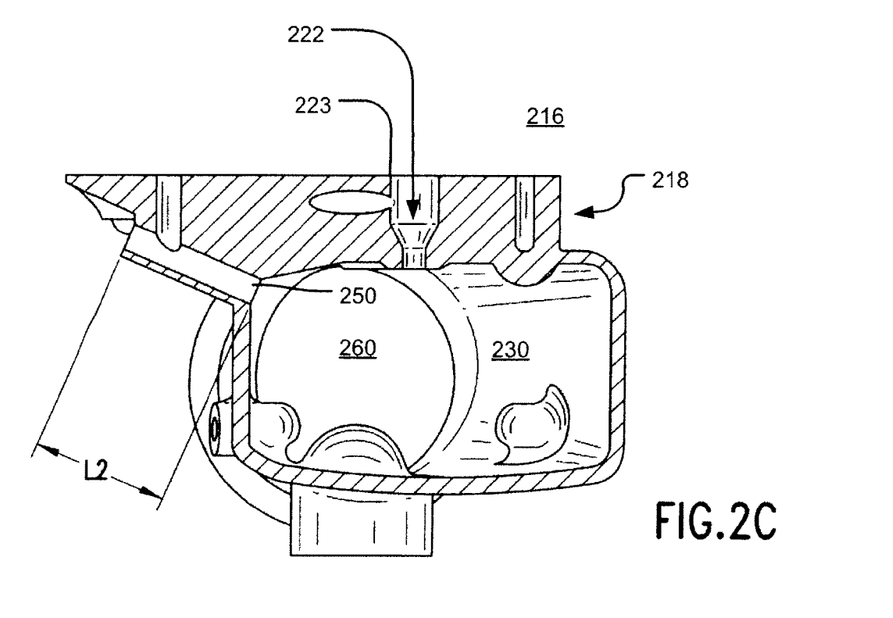
FIG. 2C is a cross-sectional diagram of the intake body shown in FIG. 1 taken along line C-C and as viewed in the direction upstream of the air stream.

FIGS. 2A to 2C illustrate an intake body 216 according to an exemplary embodiment, which can be used in the internal combustion engine system 100 shown in FIG. 1, for example, on a diesel internal combustion engine system. The intake body 216 is an example of an intake body in which pressure tap passages are drilled or cast into the intake body 216. FIG. 2A is a top perspective view of the intake body 216 illustrating a raised portion 218 to which an EGR passage is fluidly connected; FIG. 2B is a cross-sectional view taken along line B-B shown in FIG. 2A; and FIG. 2C is a cross-sectional view taken along line C-C in FIG. 2A.

As shown in FIGS. 2A to 2C, EGR gas flows into a main chamber 230 of air intake body 216 through a metering orifice 222 provided in an EGR inlet port 223. As shown in FIG. 2B, the shape of the orifice 222 creates an obstruction designed to create a measurable difference in pressure (i.e., delta-P) when EGR gas is flowing into the intake body 216. One or more transducers of a delta-P sensor, such as delta-P sensor system 120, picks up the pressure signals through delta-P pressure tap passages 240 and 250, which can be machined or cast into the intake body 216. FIG. 2B shows a cross section of the upstream pressure delta-P pressure tap passage 240 and where the delta-P pressure tap passage 250 opens into the main chamber 230, and FIG. 2C shows a cross section of the downstream delta-P pressure tap passage 250 as seen looking towards the air inlet port or opening 260 of the intake body 216.

The lengths L1 and L2 of respective delta-P pressure tap passages 240, 250 are each limited to a predetermined length value to prevent acoustic resonance of the EGR gas volume and facilitate accurate measurement of EGR flow. For example, an operating frequency bandwidth of a delta-P sensor system to be used with the intake body 216 can make it preferable to limit the lengths L1 and L2 of the delta-p pressure tap passages 240 and 250 to less than three inches, and more preferably approximately two inches, to mitigate acoustic resonance and provide acceptable S/N ratio. Delta-P pressure tap passage drillings longer than three inches would result in unacceptable levels of acoustic resonance and poor S/N ratio. Length values for L1 and L2 of one inch or less would be more preferable, but it becomes difficult at these lengths to fit the pressure sensors to the intake body within such a tight envelope. In an embodiment the cross-drilling of the downstream delta-p pressure tap passage 240 from the sensor high pressure side of the metering orifice 222 can have a total surface-to-surface length of 57 mm (2.24 inches), and the cross-drilling of the downstream delta-p pressure tap passage 250 from the sensor low pressure side of the metering orifice 222 can have a total surface to surface length of 50 mm (1.97 inches).

Figure 3:
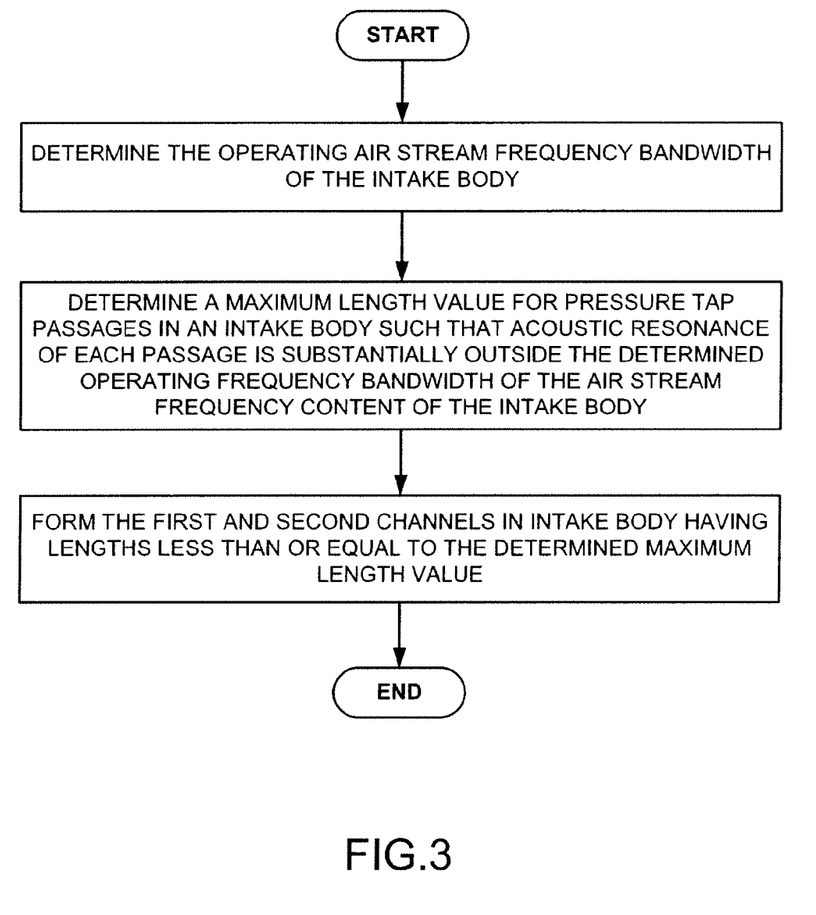
FIG. 3 is a process flow diagram in accordance with an exemplary method of reducing acoustic resonance in an exhaust gas recirculation (EGR) system.

FIG. 3 is an exemplary method 300 for reducing acoustic resonance in an exhaust gas recirculation (EGR) system including an intake body having a main chamber, an air inlet port to supply a stream of intake air to the main chamber, an exhaust inlet port including a metering orifice to deliver an exhaust gas stream to the chamber, and a delta-P sensor. The method 300 includes a process 310 of determining an operating frequency bandwidth of the delta-P sensor. Using the determined delta-P sensor operating frequency, process 320 next determines a maxi maximum length value for a first pressure tap passage in the air intake body for measuring pressure upstream of the metering orifice, and a maximum length value for a second pressure tap passage for measuring pressure downstream of the orifice, such that acoustic resonance of each pressure tap passage is outside the operating frequency bandwidth of the pressure sensor. These values may be equal to one another. However. design of the intake body shape and/or other spatial concerns may lead to a design having different lengths for the first and second delta-P pressure tap passages. In any event, both the first and second delta-P pressure tap passages should be formed no longer than the determined maximum value to achieve best S/N ratio in the sensed differential pressure signal. Next, in process 330, the first and second delta-P pressure tap passages are formed to have lengths less than or equal to the determined maximum length values.

Improvements in the S/N ratio obtained by embodiments consistent with the claimed invention were a result of the shorter specific drilling length, the port geometry, and the pressure transducer used. The delta-P sensor also can be changed to avoid natural frequency excitation. Although delta-P pressure tap passages having a length of approximately two inches provide acceptable results, shorter length tubes, drillings or castings, for example, about 1-inch or less, can provide even better results as long as a high data rate delta-P sensor can be positioned within such a tight envelope.

While the exemplary embodiments are sometimes described in the context of a diesel internal combustion engine, the same concepts can be applied in a lean burn gasoline powered internal combustion engine. Also, it is to be noted that although a "first" and "second" pressure sensor devices of a delta-P sensor system have been described herein, the terms "first" and "second" can refer to separate pressure sensor devices connected to respective pressure tap passages, or a single pressure sensor device shared time wise between plural pressure tap passages. Additionally, it is to be noted that the lengths L1 and L2 may be the same or different as long as each of the lengths are sized less than the predetermined maximum length values.

Although a limited number of embodiments is described herein, one of ordinary skill in the art will readily recognize that there could be variations to any of these embodiments and those variations would be within the scope of the appended claims. Thus, it will be apparent to those skilled in the art that various changes and modifications can be made to the system, method and apparatus for measuring EGR flow and reducing acoustic resonance described herein without departing from the scope of the appended claims and their equivalents.

What is claimed is:

1. A system for measuring an exhaust gas flow provided to an intake system of an internal combustion engine, comprising:
    an intake body including a main chamber, an air inlet port to supply a stream of intake air to said main chamber, and an exhaust inlet port including a metering orifice to deliver an exhaust gas stream to the main chamber;
    a first pressure tap passage provided upstream of the metering orifice, said first pressure tap passage having a first length between first and second ends thereof, the first pressure tap passage configured to receive a first air stream including the exhaust gas stream;
    a second pressure tap passage provided downstream of the metering orifice, said second pressure tap passage having a second length between third and fourth ends thereof, the second pressure tap passage configured to receive a second air stream including at least one of the intake air and the exhaust gas stream;
    a differential pressure sensor communicating with the first pressure tap passage to measure pressure upstream of said metering orifice, and communicating with the second pressure tap passage to measure pressure downstream of said metering orifice, said differential pressure sensor having a sampling rate and a frequency bandwidth associated with the sampling rate and configured to produce a signal based on a difference in the measured pressures,
    wherein said first and second lengths are each of a predetermined length value to prevent overlap of the natural acoustic frequencies of the first and second air streams within the respective first and second pressure tap passages and the frequency bandwidth associated with the sampling rate of the differential pressure sensor during operation of the intake body.

2. The system of claim 1, wherein the first and second pressure tap passages are integral with the intake body.

3. The internal combustion engine system of claim 1, wherein each of the first and second pressure tap passage lengths is less than about three inches.

4. The system of claim 1, wherein each of the first and second lengths is between about one to two inches.

5. The system of claim 1, wherein the metering orifice is integral with the intake body.

6. An internal combustion engine system, comprising: an engine;
    an intake manifold connected to the engine;
    an intake body fluidly connected to the intake manifold, said intake body including a main chamber through which intake charge flows;
    an exhaust manifold and main exhaust passage connected to the engine;
    an exhaust gas recirculation (EGR) passage fluidly connected at one end thereof to the main exhaust passage and at another end thereof to the main chamber of the intake body;
    a metering orifice positioned between the main chamber of the intake body and the EGR passage, said metering orifice causing EGR gas flow in the EGR passage to have a pressure as measured at a first side of the orifice different from a pressure in the main chamber of the intake body as measured at a second side of the orifice;
    a first pressure tap passage fluidly connected to the EGR passage upstream of the first side of the orifice, the first pressure tap passage configured to receive a first air stream including the EGR gas flow;
    a second pressure tap passage fluidly connected to said main chamber of said intake body, the second pressure tap passage configured to receive a second air stream including at least one of the intake charge and the EGR gas flow; and
    a differential pressure sensor communicating with said first pressure tap passage to measure pressure upstream of the metering orifice, and communicating with said second pressure tap passage to measure pressure downstream of the metering orifice, said differential pressure sensor having a sampling rate and a frequency bandwidth associated with the sampling rate and configured to produce a signal based on a difference in the measured pressures, wherein
    the lengths of each of the first and second pressure tap passages are of predetermined length values to prevent overlap of the natural acoustic resonance frequencies of the first and second air streams within the respective first and second pressure tap passages and the frequency bandwidth associated with the sampling rate of the differential pressure sensor during operation of the intake body.

7. The internal combustion engine system of claim 6, wherein the delta pressure sensor includes a pressure sensor positioned at an end of each of the first and second pressure tap passages.

8. The internal combustion engine system of claim 6, wherein the first and second pressure tap passages are integral with the intake body.

9. The internal combustion engine system of claim 6, wherein each of the pressure tap passage lengths is less than about three inches.

10. The internal combustion engine system of claim 6, wherein each of the pressure tap passage lengths is between about one to two inches.

11. The internal combustion engine system of claim 6, wherein the metering orifice is integral with the intake body.

12. A method of reducing an effect of acoustic resonance on a differential pressure sensor signal in an exhaust gas recirculation (EGR) system including an intake body having a main chamber, an air inlet port to supply a stream of intake air to said chamber, an exhaust inlet port including a metering orifice to deliver an exhaust gas stream to the chamber, and a differential pressure sensor, said differential pressure sensor having a sampling rate and producing a signal having a frequency bandwidth associated with the sampling rate, the method comprising:
- determining air stream frequency content present in the intake body during operation of the intake body;
- determining a maximum length for a first pressure tap passage in the air intake body for measuring pressure upstream of the metering orifice and for a second pressure tap passage for measuring pressure downstream of the orifice, such that the bandwidth of the signal does not overlap with the natural acoustic resonance frequency of air streams within each of the first and second pressure tap passages; and
- forming the first and second pressure tap passages having lengths less than or equal to the determined maximum length values.

\* \* \* \* \*